July 16, 1968  J. W. ALLMAND  3,392,935
VERTICAL TAKE-OFF AIRCRAFT
Filed Dec. 7, 1966  3 Sheets-Sheet 1

INVENTOR
JOHN W. ALLMAND
BY
Salvatore G. Militana,
attorney

July 16, 1968

J. W. ALLMAND 3,392,935

VERTICAL TAKE-OFF AIRCRAFT

Filed Dec. 7, 1966

INVENTOR
JOHN W. ALLMAND
BY
Salvatore G. Militana,
attorney

July 16, 1968  J. W. ALLMAND  3,392,935
VERTICAL TAKE-OFF AIRCRAFT
Filed Dec. 7, 1966  3 Sheets-Sheet 3
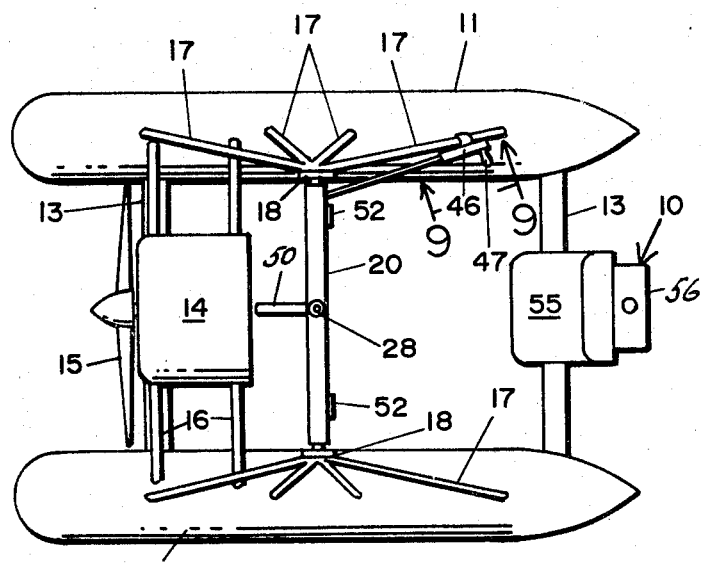
FIG. 7
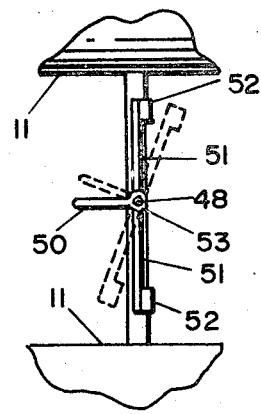
FIG. 8
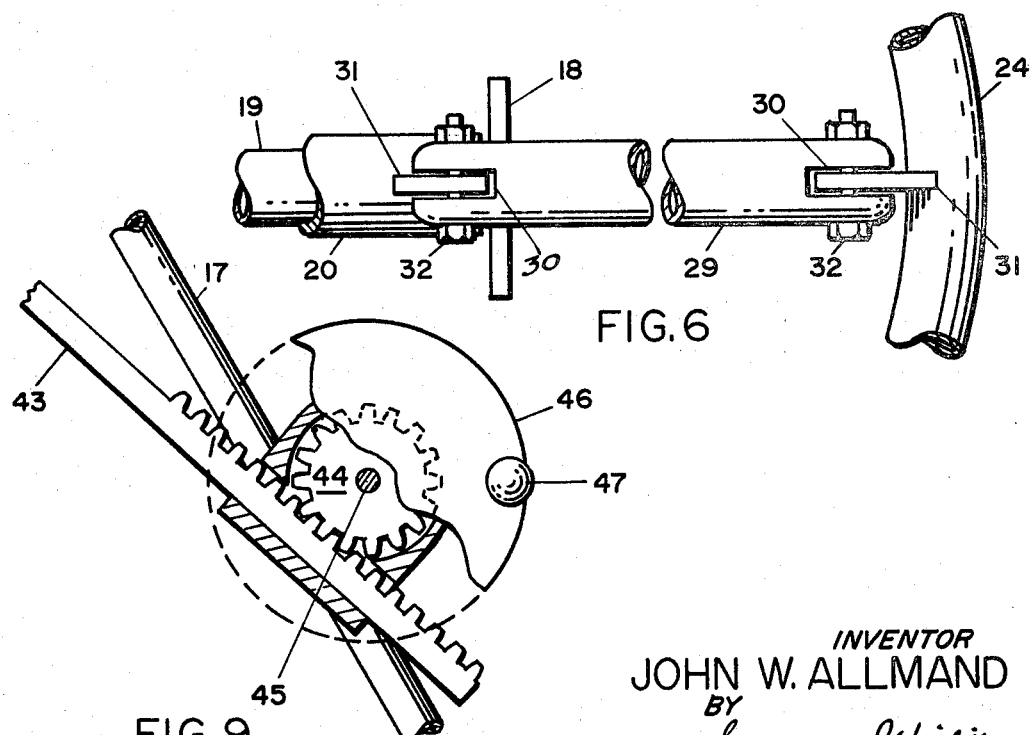
FIG. 6
FIG. 9
INVENTOR
JOHN W. ALLMAND
BY
Salvatore G. Militano,
attorney

United States Patent Office 3,392,935
Patented July 16, 1968

3,392,935
VERTICAL TAKE-OFF AIRCRAFT
John W. Allmand, 300 Cypress Drive,
Key Biscayne, Miami, Fla. 33149
Filed Dec. 7, 1966, Ser. No. 599,854
2 Claims. (Cl. 244—7)

ABSTRACT OF THE DISCLOSURE

A vertical take-off aircraft having support struts mounted on pontoons with an engine driven propeller mounted on the struts and a rudder positioned in alignment therewith, a circular canopy pivotally mounted on the support struts above the aircraft and hand operated tilting mechanism for adjusting the vertical angle of the canopy and determining the rate of vertical rise or fall of the aircraft.

---

This invention relates to aircraft and is more particularly directed to a vertical take-off aircraft.

The conventional vertical take-off aircraft such as helicopters and autogiros obtain their lift from a horizontally disposed propeller and upon malfunctioning of the propeller as upon destruction of the propeller, the aircraft will plummet to the earth or at least descend at an unsafe speed. The present invention contemplates the use of the conventional vertically disposed propeller for its lift in combination with a canopy or umbrella type wing which also acts as a parachute in the event of power failure whereby the descent of the aircraft will be at a safe speed.

Therefore a principal object of the present invention is to provide a vertical take-off aircraft with the conventional airplane motor whose propeller revolves in a vertical plane in combination with a circular wing whose attitute is readily adjusted to provide the desired rate of climb or descent.

Another object of the present invention is to provide a vertical take-off aircraft with a circular canopy type wing which is hinged so that it may be retracted to reduce the size thereof for storage purposes or when being towed in a restricted area as on highways and the like.

A further object of the present invention is to provide a vertical take-off aircraft which is simple in construction and design, inexpensive in cost and simple to operate.

A still further object of the present invention is to provide a vertical take-off aircraft which will descend at a safe rate of speed under all conditions notwithstanding power failure or destruction of the propeller.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 6 is a plan view of the structure of the wing brace.

Figures 1, 2, 5:
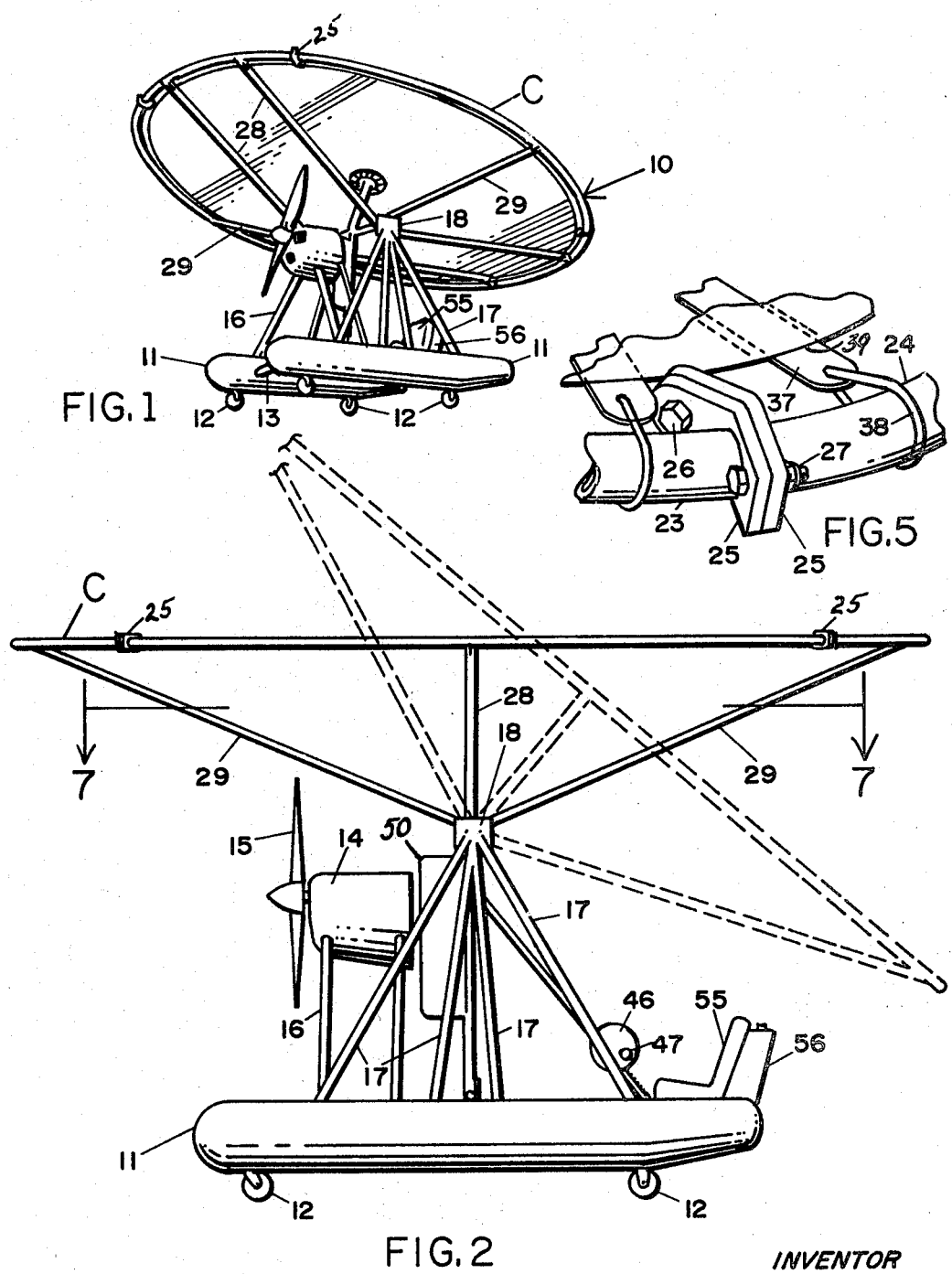
FIGURE 1 is a perspective view of a vertical take-off aircraft constructed in accordance with my invention.
FIGURE 2 is a side elevational view showing the position of the wing for take-off in dotted lines.
FIGURE 5 is a detailed perspective view of the hinge structure of the canopy wing.
Figure 4:
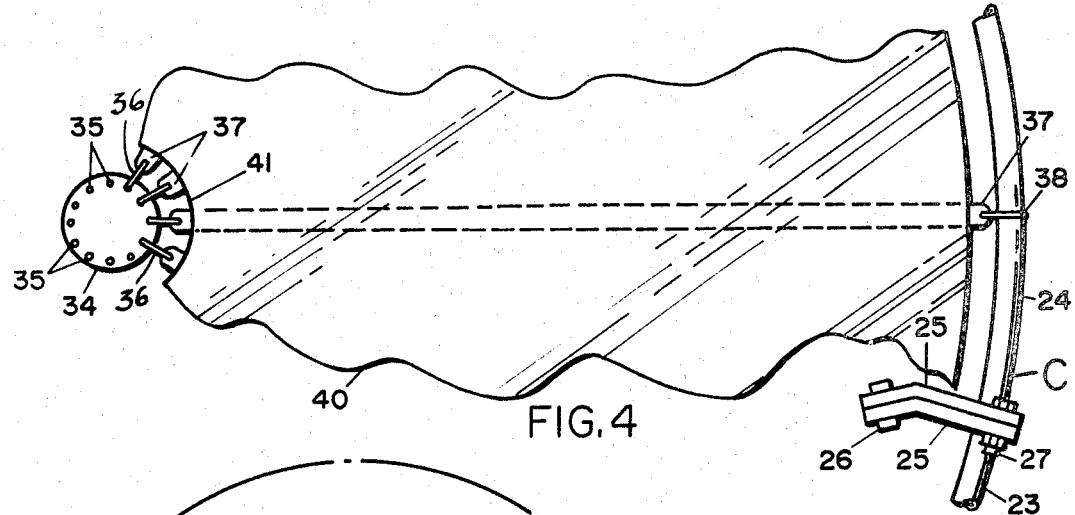
FIGURE 4 is a fragmentary top plan view of the canopy wing.
Figure 3:
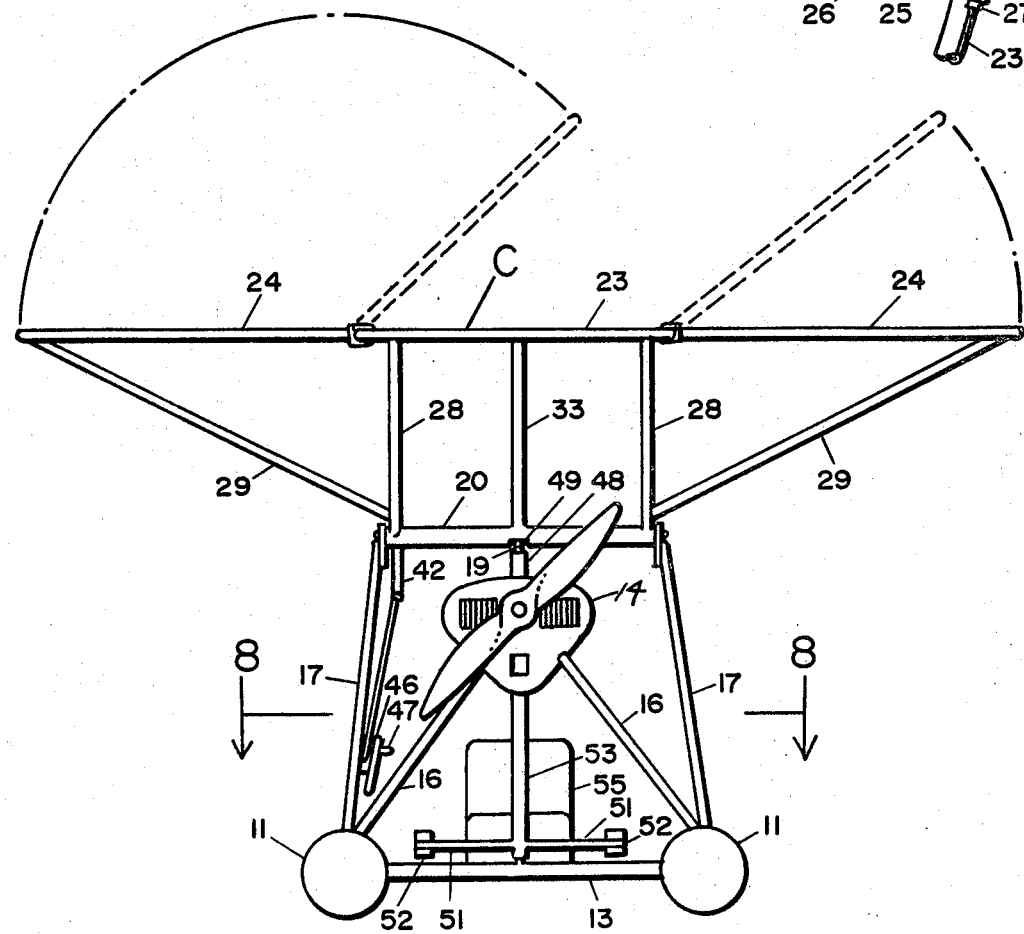
FIGURE 3 is a front elevationl view showing the manner of folding canopy wing to reduce the width of the aircraft.

FIGURES 7 and 8 are cross sectional views taken along the lines 7—7 and 8—8 respectively of FIGURES 2 and 3.

FIGURE 9 is a fragmentary view of the operating mechanism for adjusting the canopy wing.

Referring to the drawings wherein like numerals are used to designate similar parts throughout the several views, the numeral 10 refers to a vertical take-off aircraft constructed in accordance with my invention and consisting of a pair of spaced apart pontoons 11 with ground engaging wheels 12 secured thereto for rolling over the ground. A plurality of brace members 13 extend between the floats or pontoons 11 for securing the latter rigidly together.

Mounted above the pontoons 11 and positioned medially therebetween is an engine 14 supported on struts 16, 16 which extend to the pontoons 11 on each side of the engine 14, the latter being provided with a conventional propeller 15.

A plurality of further struts 17 are secured at their lower ends to the pontoons 11 extending in a converging direction upwardly with their upper ends welded or otherwise secured to a support plate 18. A brace pipe member 19 extends between the plate members 18 having its ends welded thereto. Telescopically mounted on the pipe member 19 is a rotatable pipe member 20 upon which a canopy type wing C is mounted for rotatable movement thereon. The wing C is circular in shape formed by four arcuate pipe members 23, 23 and 24, 24, the pipe members 23 being fixed while the pipe members 24 are hinged to the ends of the pipe member 23. The function of hinging the pipe members 24 to the fixed pipe members 23 is to reduce the size of the canopy to approximately the width of the aircraft 10 at its pontoons 11 as best illustrated in FIGURE 3.

At the ends of each of the arcurate pipe members 23 and 24 are hinge plates 25 in abutting relation with a pivot pin 26 pivotally mounting the hinge plates 25 together at one end. The other end of the hinge plates 25 are secured together by a bolt 27 which is readily removed when it is desired to retract the canopy wing C. The hinge plates 25 are bent at a position adjacent the pivot pin 26 to permit the arcuate pipe members 24 to swing without effecting any binding.

The fixed arcuate pipe members 23 are supported by struts 28 whose lower ends are welded to the pipe 20 and the upper ends being welded to the arcuate pipe members 23. The retractable arcuate pipe members are supported by removable struts 29 whose ends are removably secured to the pipe 20 and arcuate pipe members 24. The ends of the struts 29 are slotted or bifurcated as at 30 to receive a plate member 31 whose end is welded on the pipes 20 and 24. A removable pin 32 extends through openings in the ends of the pipe 29 and the plates 31 for securing the pipe 29 in position and thereby supporting the arcuate pipe members 24.

Besides the arcuate pipe members 23 and 24, the frame work of the canopy wing C consists of a centrally disposed upright pipe member 33 whose lower end is welded to the rotatable pipe 20 and at whose upper end a canopy support disc 34 is mounted. The latter is provided with a plurality of bores 35 for receiving links 36 which are secured to the ends of canopy support ribbons 37 made of stainless steel sheet metal. The other ends of the ribbons 37 are secured to rings 38 that extend about the arcuate pipes 23 and 24. The steel ribbons 37 extend through radially disposed pockets 39 formed in the fabric or plastic canopy 40. There is a centrally disposed opening 41 in the canopy for the primary purpose of spilling air therethrough when the aircraft is descending in order to give the same effect to the canopy 40 as a parachute. Also, the flexible nature of the steel ribbons 37 and the canopy 40 itself permits the canopy 40 to act as a parachute during a free falling descent.

Since the canopy upright support pipe 33 and the canopy braces 28 and 29 are secured at their lower ends to the rotatable pipe 20, the angular position of the canopy wing C may be changed as desired. This action is effected by a depending arm member 42 having its upper end welded to the rotatable pipe 20 and the lower end secured to a rack 43 that is in mesh engagement with a pinion gear 44 secured to a crank wheel 46. The pinion gear 44 and crank wheel 46 are rotatably mounted on a pin 45 which is supported on the strut 17. The crank wheel 46 is provided with a handle 47 for rotating the pinion gear 44 to cause the rack 43 to oscillate and the canopy wing C to pivot about the rotatable pipe 20.

A rudder system for steering the aircraft in flight is provided consisting of an upright pipe support member 48 welded at its lower end to the centrally positioned brace 13 and at its upper end to the brace pipe 19 extending through a slot 49 in the pipe 20 formed to permit rotation of the pipe 20. A second pipe 53 is telescopically mounted on the pipe 49. Mounted on the rudder support pipe 53 is a rudder 50 that extends in the direction of the engine 14. Means for actuating the rudder 50 consists of a pair of pedal support members 51 extending toward the pontoons 11 from the lower end of the rudder support pipe 53. Mounted on the ends of the pedal support members 51 are pedals 52. With a pilot seated on a seat 55 that is mounted on the rearmost brace 13, an operator of the aircraft 10 is able to manually manipulate the crank wheel 46 for adjusting the attitude of the canopy wing C and with his feet resting on the pedals 52 adjust the position of the rudder 50. A gasoline tank 56 is mounted behind the seat 55 and is connected by piping (not shown) to the engine 14.

In the normal operation of my vertical take-off aircraft 10, after the engine 14 is started and the propeller 15 is rotating, the operator who is seated in the seat 55 with his feet on the pedals 52 will rotate the crank wheel 46 to tilt the canopy wing C rearwardly until it assumes the approximate position as shown by dotted lines in FIGURE 2. The air stream issuing from the rotating propeller 15 will strike the lower surface of the tilted canopy wing C and be deflected downwardly to impart an upward force on the canopy 40. If the angle of tilt of the canopy wing C is greater than 45°, the aircraft 10 will tend to rise as it moves slightly rearwardly, while if the angle of tilt is less than 45° the aircraft will rise as it flies forwardly. When it is decided to fly in a level flight the canopy wing C is then returned to its horizontal position; and to descend, the canopy wing C is maintained in its horizontal position as the propeller speed is reduced. If the engine should fail or it is decided to fall or descend freely, the canopy wing C in its horizontal position will permit the aircraft to descend vertically at approximately the same speed as one descends in a parachute taking into consideration the weight of the aircraft 10 and the size of the canopy wing C.

What I claim as new and desire to secure by Letters Patent of the United States is:

1. A vertical take-off aircraft comprising support means, a plurality of support members extending upwardly of said support means, a horizontally disposed member extending between said support members, canopy wing means rotatably mounted on said horizontally disposed member, said canopy wing means having a pipe member telescopically mounted on said horizontally disposed member, an upright member extending upwardly of said pipe member, arcuate means forming the peripheral portion of said canopy wing means, radially disposed support members extending from said upright member and to said arcuate means, resilient sheet material covering said canopy and engaging said radially disposed support members, further support members extending upwardly of said support means, an engine mounted on said further support members, propeller means connected to said engine, rudder means rotatably mounted rearwardly of said engine and rudder actuating means operatively connected to said rudder means for adjustably positioning said rudder means.

2. A vertical take-off aircraft comprising a pair of spaced apart pontoons rigidly secured together, a plurality of struts extending upwardly of said pontoons at substantially the mid-portion thereof, plate members secured to the upper ends of said struts, a horizontally disposed pipe member extending between said struts, a second pipe member telescopically mounted on said first named pipe member, a canopy support pipe member extending upwardly of said second pipe member, a circular plate member mounted on said canopy support pipe member, circular pipe means forming the peripheral edge of a canopy wing, radially disposed elongated members extending from said circular plate member to said circular pipe means, a fabric member engaging said elongated members and extending over the area between said circular plate member and said circular pipe means, an arm extending from said second pipe member, a rack secured at one end to said arm, a pinion gear in mesh engagement with said rack and crank means rotatably mounted on one of said struts and secured to said pinion gear for adjusting the position of sand canopy wing, further struts extending upwardly of said pontoons, an engine mounted on said further struts, a propeller mounted on said engine, a rudder, rotatable support means mounting said rudder in alignment with said engine and foot actuated means connected to said rudder for operating said rudder.

References Cited

UNITED STATES PATENTS

| 1,292,662 | 1/1919 | Sumner et al. | 244—139 X |
| 1,297,264 | 3/1919 | Simms | 244—139 X |
| 1,768,863 | 7/1930 | Schleicher | 244—49 |
| 3,135,483 | 6/1964 | Girard | 244—138 X |
| 3,223,361 | 12/1965 | Girard | 244—49 |

MILTON BUCHLER, *Primary Examiner.*

FERGUS S. MIDDLETON, *Examiner.*

T. W. BUCKMAN, *Assistant Examiner.*